(12) United States Patent
Byun et al.

(10) Patent No.: US 12,045,163 B2
(45) Date of Patent: Jul. 23, 2024

(54) STORAGE DEVICE FOR CLASSIFYING DATA BASED ON STREAM CLASS NUMBER, STORAGE SYSTEM, AND OPERATING METHOD THEREOF

(71) Applicant: SAMSUNG ELECTRONICS CO., LTD., Suwon-si (KR)

(72) Inventors: Hyung-Kyun Byun, Yongin-si (KR); Byung June Song, Suwon-si (KR); Song Ho Yoon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/144,335

(22) Filed: May 8, 2023

(65) Prior Publication Data

US 2023/0273878 A1 Aug. 31, 2023

Related U.S. Application Data

(63) Continuation of application No. 17/185,001, filed on Feb. 25, 2021, now abandoned.

(30) Foreign Application Priority Data

Jun. 23, 2020 (KR) .................. 10-2020-0076310

(51) Int. Cl.
*G06F 12/02* (2006.01)
*G06F 3/06* (2006.01)
(Continued)

(52) U.S. Cl.
CPC ........ *G06F 12/0253* (2013.01); *G06F 3/0608* (2013.01); *G06F 3/0652* (2013.01);
(Continued)

(58) Field of Classification Search
CPC .... G06F 3/0679; G06F 3/0659; G06F 3/0608; G06F 3/0652; G06F 12/0253;
(Continued)

(56) References Cited

U.S. PATENT DOCUMENTS

| 8,521,948 B2 | 8/2013 | Post et al. |
| 10,101,947 B2 | 10/2018 | Hong et al. |

(Continued)

FOREIGN PATENT DOCUMENTS

| KR | 10-2015-0096177 A | 8/2015 |
| KR | 10-2018-0119473 A | 11/2018 |

OTHER PUBLICATIONS

European Office action dated Oct. 1, 2021, and European Search Report dated Sep. 21, 2021.

*Primary Examiner* — Hashem Farrokh
(74) *Attorney, Agent, or Firm* — Muir Patent Law, PLLC

(57) ABSTRACT

A storage device includes: a buffer to receive first data and second data from outside, and store the first data and the second data on a first page; a non-volatile memory to store the first data and the second data in a first block; and a controller to perform a program operation that programs the first and second data in free blocks different from each other through a garbage collection. The first data may include a first stream class number identifying characteristics of the first data, and the second data may include a second stream class number identifying characteristics of the second data and is different from the first stream class number. The controller may transmit information of the program operation to the outside before performing the program operation. The controller may perform the program operation when receiving a program execution permission command from the outside.

19 Claims, 19 Drawing Sheets

(51) Int. Cl.
  *G06F 12/1009* (2016.01)
  *G06F 16/28* (2019.01)
(52) U.S. Cl.
  CPC .......... *G06F 3/0659* (2013.01); *G06F 3/0679* (2013.01); *G06F 12/1009* (2013.01); *G06F 16/285* (2019.01); *G06F 2212/1044* (2013.01); *G06F 2212/657* (2013.01)
(58) Field of Classification Search
  CPC ............ G06F 12/1009; G06F 12/0246; G06F 16/285; G06F 2212/1028; G06F 2212/1044; G06F 2212/7201; G06F 2212/657; G06F 2212/7203; G06F 2212/7205; G06F 2212/7209; Y02D 10/00
  USPC .......................................................... 711/103
  See application file for complete search history.

(56) References Cited

U.S. PATENT DOCUMENTS

| | | | |
|---|---|---|---|
| 10,120,606 | B2 | 11/2018 | Kim et al. |
| 10,296,455 | B2 | 5/2019 | Yanagida |
| 2014/0032817 | A1* | 1/2014 | Bux .................... G06F 12/0261 711/E12.008 |
| 2017/0123655 | A1* | 5/2017 | Sinclair .................... G06F 3/061 |
| 2017/0315730 | A1* | 11/2017 | Hashimoto ........... G06F 3/0643 |
| 2018/0307598 | A1 | 10/2018 | Fischer et al. |
| 2019/0121567 | A1* | 4/2019 | Kim ....................... G06F 3/064 |
| 2019/0146679 | A1* | 5/2019 | Doh ...................... G06F 3/0679 711/103 |
| 2019/0171564 | A1 | 6/2019 | Bahirat |
| 2019/0205062 | A1 | 7/2019 | Sun et al. |
| 2020/0387447 | A1* | 12/2020 | Byun ....................... G06N 5/04 |
| 2020/0394134 | A1* | 12/2020 | Na ...................... G06F 12/0253 |

* cited by examiner

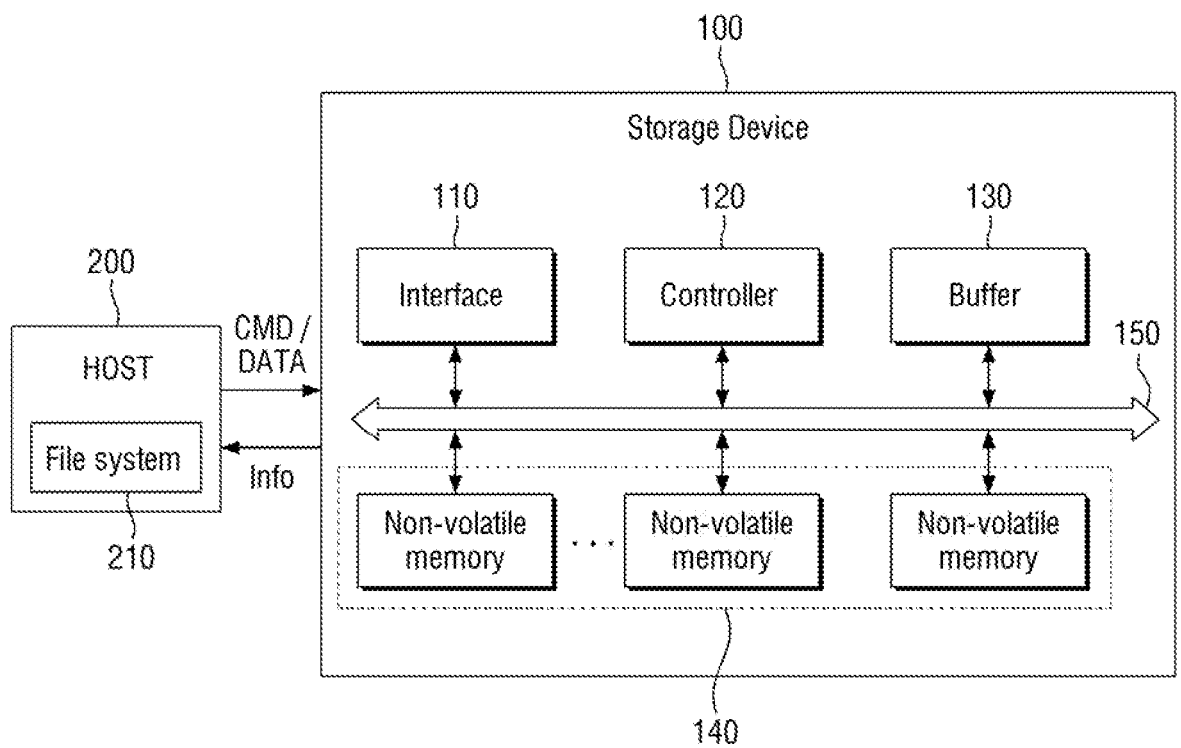

FIG. 6

Physical Mapping Table

| Logical Block Address | Physical Block Address |
|---|---|
| LBA #1 | PBA #1 |
| LBA #2 | PBA #2 |
| ... | ... |
| LBA #N | PBA #N |

FIG. 8

Stream Mapping Table

| Logical Block Address | Stream Class Number |
|---|---|
| LBA #1 | Stream 1 |
| LBA #2 | Stream 2 |
| ... | ... |
| LBA #N | Stream N |

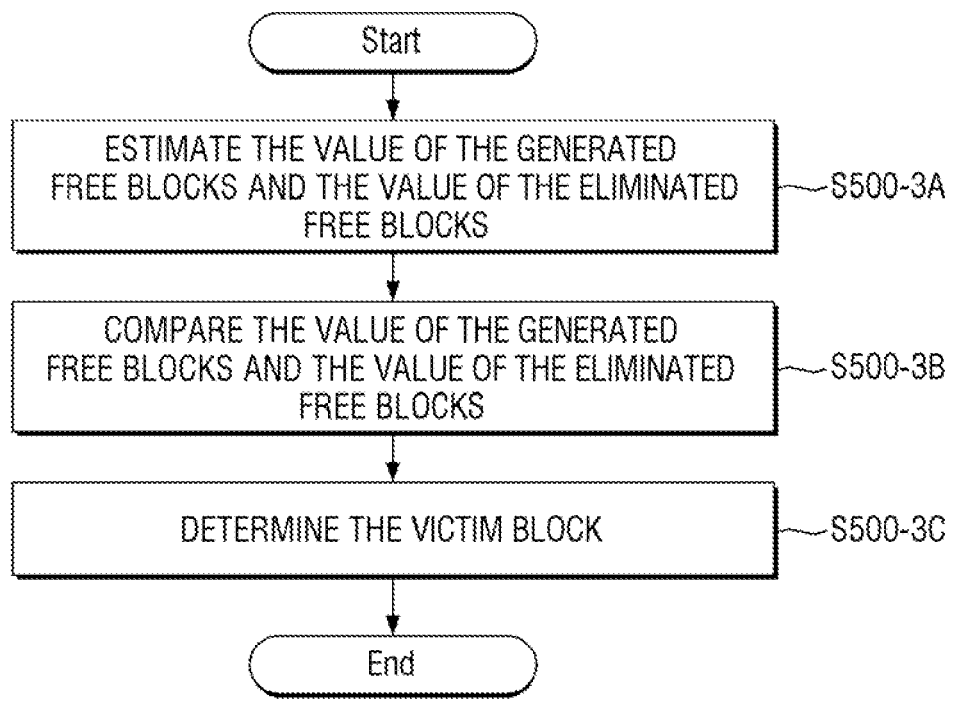

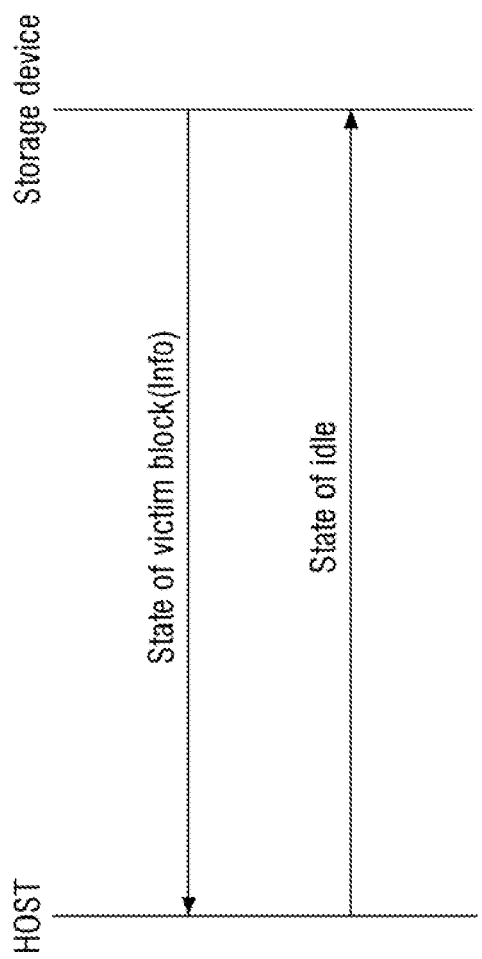

STORAGE DEVICE FOR CLASSIFYING DATA BASED ON STREAM CLASS NUMBER, STORAGE SYSTEM, AND OPERATING METHOD THEREOF

This is a continuation application based on pending application Ser. No. 17/185,001, filed Feb. 25, 2021, the entire contents of which is hereby incorporated by reference.

Korean Patent Application No. 10-2020-0076310, filed on Jun. 23, 2020, in the Korean Intellectual Property Office, and entitled: "Storage Device for Classifying Data Based on Stream Class Number and Operating Method Thereof," is incorporated by reference herein in its entirety.

BACKGROUND

1. Field

Embodiments relate to a stream classifying device and an operating method thereof.

2. Description of the Related Art

Demands for data storage devices, for example, NAND-based drives, have been increasing due to their high performance and low power consumption.

SUMMARY

Embodiments are directed to a storage device, including: a buffer configured to receive first data and second data from outside, and store the first data and the second data on a first page; a non-volatile memory configured to store the first data and the second data in a first block; and a controller configured to perform a program operation that programs the first and second data in free blocks different from each other through a garbage collection. The first data may include a first stream class number that identifies characteristics of the first data, and the second data may include a second stream class number that identifies characteristics of the second data and is different from the first stream class number. The controller may be configured to transmit information of the program operation to the outside before performing the program operation. The controller may be configured to perform the program operation when receiving a program execution permission command from the outside.

Embodiments are also directed to a storage device, including: a host configured to transmit data including stream class numbers that are classified depending on characteristics of data; a non-volatile memory including a plurality of blocks in which data received from the host are arbitrarily stored regardless of the stream class numbers; and a controller configured to perform a program operation that programs data having a same stream class number in a same block, on the basis of the stream class numbers that are classified depending on the characteristics of the data. The controller may be configured to transmit information of the program operation to the host before performing the program operation. The controller may perform the program operation when receiving a program execution permission command from the host.

Embodiments are also directed to an operating method of a storage device, including: receiving, from a host, data including stream class numbers that are classified depending on characteristics of data; storing the data in a free block in a non-volatile memory; determining whether the data needs to be classified depending on the stream class numbers; when it is determined that the data need to be classified depending on the stream class numbers, determining a victim block in which classification is performed through garbage collection, among blocks in which the data are stored in the non-volatile memory; transmitting information about performing the garbage collection on the victim block to the host; and when an executable message of the garbage collection is received from the host, performing the garbage collection on the victim block, and classifying the data in the victim block depending on the stream class numbers to program the data in the free block.

BRIEF DESCRIPTION OF THE DRAWINGS

Features will become apparent to those of skill in the art by describing in detail example embodiments with reference to the attached drawings in which:

FIG. 1 is an example block diagram for explaining a storage system including a storage device according to some example embodiments.

FIG. 2 is an example diagram for explaining data received from a host according to some example embodiments.

FIG. 6 is an example diagram for explaining the physical mapping table according to some example embodiments.

FIG. 8 is an example diagram for explaining the stream mapping table according to some example embodiments.

FIG. 20 is an example flowchart for explaining the operation of FIGS. 18 and 19 for determining the victim block according to some example embodiments.

FIG. 21 is an example diagram for explaining a signal transmission operation between the host and the storage device according to some example embodiments.

DETAILED DESCRIPTION

Figure 3:
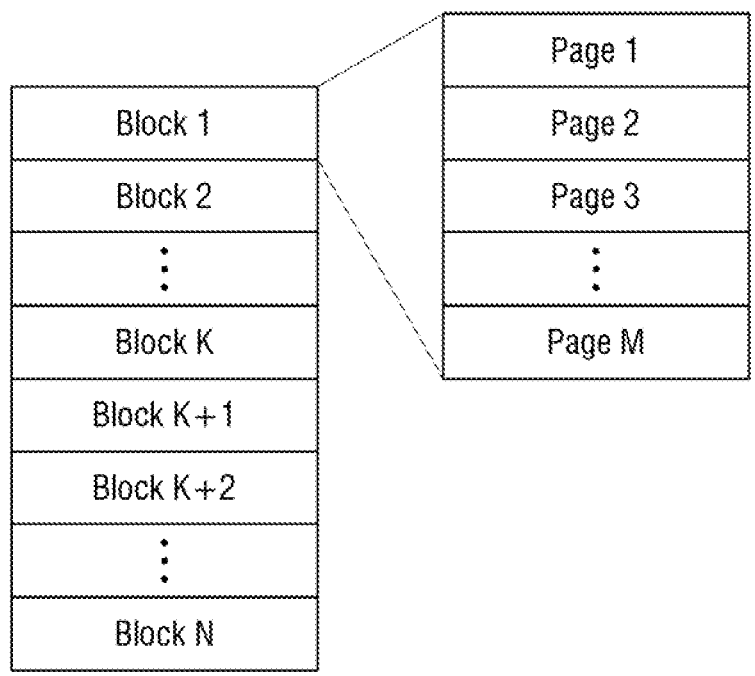
FIG. 3 is an example diagram for explaining a block stored in the non-volatile memory according to some example embodiments.

FIG. 1 is an example block diagram for explaining a storage system including a storage device according to some example embodiments.

Referring to FIG. 1, a storage system according to some example embodiments may include a storage device 100, and a host 200 outside the storage device 100. Each configuration may be made up of separate chips, modules, or devices, and may be included in a single device. For example, the storage device 100 may also be used by being connected to a separate host 200. However, the storage device 100 and the host 200 may be integrated in a single device.

The host 200 may transmit a command CMD including a write command and data DATA including write data to the storage device 100, using an application or a file system 210. Also, the host 200 may transmit a command CMD including a read command and data DATA including read data to the storage device 100, using an application or a file system 210.

The host 200 may be driven by executing an operating system (OS). The operating system may include a file system 210 for file management, and a device driver for controlling peripherals, including a data storage device, at an operating system level. The file system 210 may manage the file name, extension, file attributes, file size, cluster information, etc. of the files accessed according to the request of the host 200. Further, the file-based data may be generated, deleted, and managed by the file system 210. The device driver may be a software module or kernel for controlling the data storage device. The host 200 may request a write operation and a read operation on the storage device 100 using the device driver. Also, the host 200 may execute a video application, a game application, a web browser application, etc. to provide various services.

The host 200 may be, for example, an electronic device such as a PC (personal computer), a laptop, a mobile phone, a smart phone, a tablet PC, an MP3 player, a PDA (personal digital assistant), an EDA (enterprise digital assistant), a PMP (portable multimedia player), a digital camera, a music player, a portable game console, a navigation device, a wearable device, an IoT (internet of things) device, an IoE (internet of everything) device, an e-book, a VR (virtual reality) device, an AR (augmented reality) device, etc.

The data DATA transmitted by the host 200 to the storage device 100 may include information on the stream class number for identifying the characteristics of the data. This will be explained in detail in connection with FIG. 2.

FIG. 2 is an example diagram for explaining data received from a host according to some example embodiments.

Referring to FIG. 2, data 500 and 510 received from the host 200 may include data 500, and a stream class number 510 for identifying the characteristics of the data 500. The stream class number 510 for identifying the characteristics of the data 500 may be determined by various factors such as the kind of the data 500, the type of the data 500, the lifetime of the data 500, and/or the update frequency of the data 500. For example, a stream class number for identifying the characteristics of a first data (DATA #1) may be a stream class number 1 (Stream 1). A stream class number for identifying the characteristics of a second data (DATA #2) may be a stream class number 4 (Stream 4). A stream class number for identifying the characteristics of a third data (DATA #3) may be a stream class number 3 (Stream 3). A stream class number for identifying the characteristics of a fourth data (DATA #4) may be a stream class number 1 (Stream 1). Here, the first data (DATA #1) and the fourth data (DATA #4) including the stream class number 1 may have the same or similar lifetime with each other.

Figure 5:
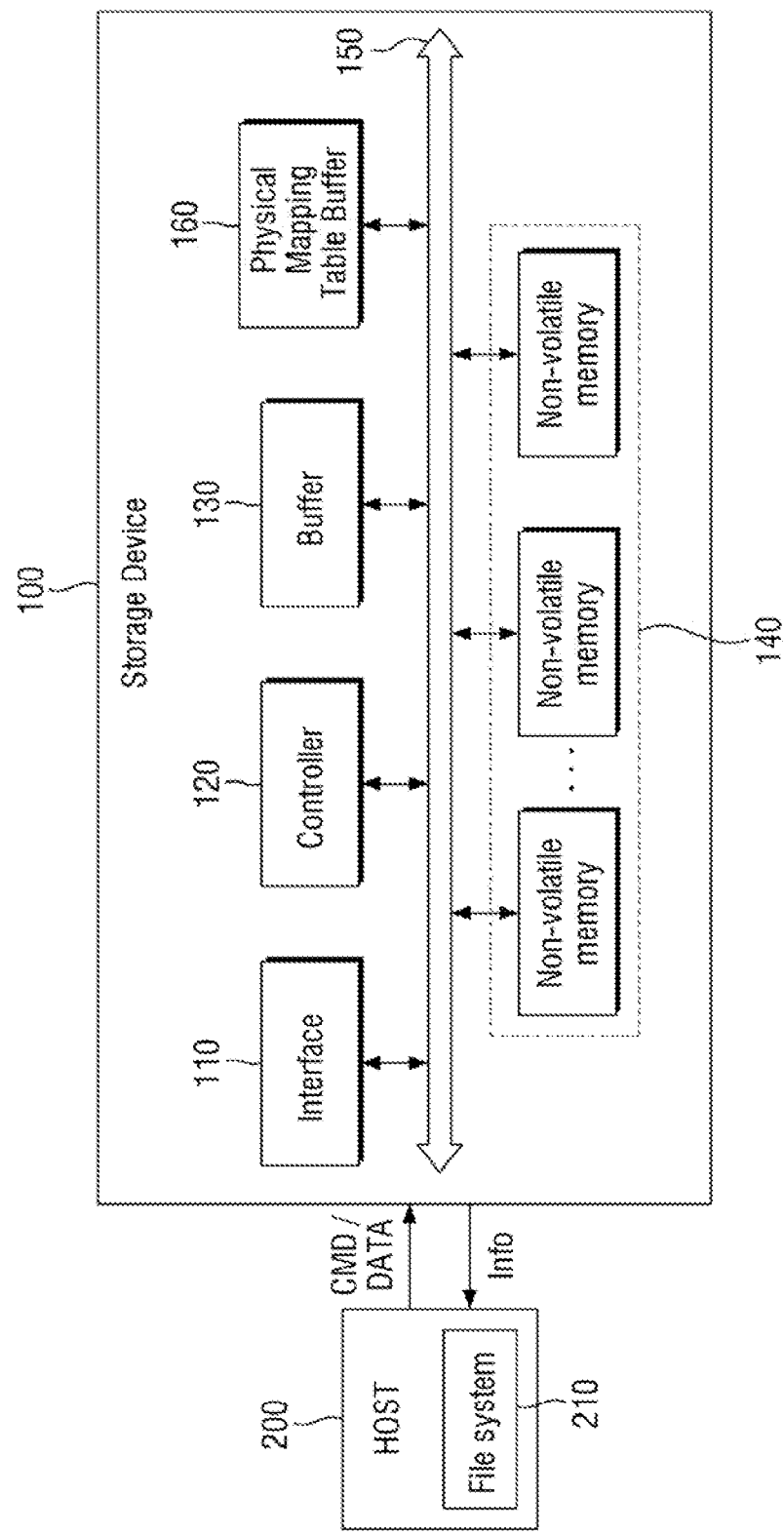
FIG. 5 is an example block diagram for explaining a storage system that includes a storage device including a physical mapping table buffer according to some example embodiments.

The first to fourth data (DATA #1 to Data #4), the stream class number 1 (Stream 1), the stream class number 3 (Stream 3), and the stream class number 4 (Stream 4) shown in FIG. 5 are terms arbitrarily selected for easy of explanation, and may be varied. For example, the stream class numbers may be divided into Hot, Warm, and Cold pages.

The data received from the host 200 may include address information and/or error correction parity (ECC parity), in addition to the data 500 and the stream class number 510 for identifying the characteristics of the data 500.

Referring to FIG. 1 again, the host 200 may include a directive function. The directive function may be a function of predetermining the stream class number depending on the type and kind of data from the host 200 and transmitting it to the storage device 100. Thus, the data received from the host 200 may include that data and the stream class number thereof. Thus, it the stream class numbers may not be separately classified in the storage device 100.

Data having the same stream class number may have interrelated or similar lifetime. For example, data updated frequently and repeatedly may have the same stream class number. Also, for example, similar types of data may have the same stream class number. Since similar types of data may be assumed to have similar lifetime, data having the same stream class number may have similar lifetime to each other.

The storage device 100 may control internal operations (for example, reading and writing) at the request from the host 200.

The storage device 100 may include an interface 110, a controller 120, a buffer 130, and a non-volatile memory 140.

The interface 110 may operate using a protocol for performing data exchange between the host 200 and the controller 120. As an example, the interface 110 may be configured to communicate with the host 200 through at least one of the various interface protocols, such as a USB (Universal Serial Bus) protocol, a MMC (multimedia card) protocol, a PCI (peripheral component interconnection) protocol, a PCI-E (PCI-express) protocol, an ATA (Advanced Technology Attachment) Protocol, a Serial-ATA protocol, a Parallel-ATA protocol, an SCSI (small computer small interface) protocol, an ESDI (enhanced small disk interface) protocol, an IDE (Integrated Drive Electronics) protocol, a NVMe (Non-Volatile Memory express) protocol, and a query request protocol. Also, the interface 110 may include at least one processor. The processor included in the interface 110 may be, for example, a microprocessor.

The controller 120 may control the interface 110, the buffer 130, and the non-volatile memory 140. The controller 120 may exchange commands and data between the host 200 and the non-volatile memory 140, and between the host 200 and the buffer 130 through the interface 110. Further, a series of operations of the storage device 100 may be performed by the controller 120. Also, the controller 120 may include at least one processor. The processor included in the controller 120 may be, for example, a microprocessor.

The buffer 130 may temporarily store the data received from the host 200. The buffer 130 may include a high-speed volatile memory or a non-volatile memory. For example, the buffer 130 may be an SLC (Single Level Cell) region of a DRAM (Dynamic Random Access Memory), a SRAM (Static Random Access Memory), a flash memory, etc.

The non-volatile memory 140 may store data temporarily stored in the buffer 130. The non-volatile memory 140 may be, for example, a flash memory including a NAND flash. The flash memory may include an SLC (Single Level Cell) and an MLC (Multi Level Cell) region. The non-volatile memory 140 may include a PC card (PCMCIA: personal computer memory card international association), a compact flash card (CF), a smart media card (SM, SMC), a memory stick, a multimedia card (MMC, RS-MMC, MMCmicro), an SD card (SD, miniSD, microSD, and SDHC), a universal flash storage device (UFS), an embedded multimedia card (eMMC), a NAND flash memory, a NOR flash memory, a V-NAND Flash Memory, etc. An example of the non-volatile memory 140 will now be described referring to FIG. 3.

FIG. 3 is an example diagram for explaining a block stored in the non-volatile memory according to some example embodiments.

Referring to FIG. 3, the non-volatile memory 140 may include a plurality of memory blocks (Block 1 to Block N).

Some of the plurality of memory blocks (Block 1 to Block N) may store data including various stream class numbers. Thus, the plurality of data stored in the buffer 130 may be arbitrarily stored in each of some of the plurality of memory blocks (Block 1 to Block N), regardless of the stream class number. For example, the data including the first stream class number and the data including the second stream class number may be stored together in the first memory block (Block 1).

Or, some of the plurality of memory blocks (Block 1 to Block N) may store data including the same stream class number. Thus, as the plurality of data stored in the buffer 130, only the data including the stream class number assigned to each of some of the plurality of memory blocks (Block 1 to Block N) may be stored. For example, a Kth+1 memory block (Block K+1) may store only the data including the first stream class number, and a Kth+2 dedicated memory block (Block K+2) may store only data including the second stream class number. Thus, some of the plurality of memory blocks (Block 1 to Block N) may be stored for only one stream class number. For example, assuming that each of the first and second data includes the first stream class number and the third data includes the second stream class number, the first and second data may be stored in the Kth+1 dedicated memory block (Block K+1), and the third data may be stored in the Kth+2 dedicated memory block (Block K+2).

Each of the plurality of memory blocks (Block 1 to Block N) may include a plurality of pages Page 1 to Page M. A page may be the smallest unit for writing data. Thus, the minimum unit of the writing operation of the storage device 100 may be a page.

Referring to FIG. 1 again, the storage device 100 may include a data bus 150 that may be used for performing the data communication among the interface 110, the controller 120, the buffer 130, and the non-volatile memory 140. The data bus 150 may correspond to a path through which data is moved, and may operate using protocols for exchanging the data.

In the explanations described above with reference to FIG. 3, when data including the various stream class numbers are stored in each of some of the plurality of memory blocks (Block 1 to Block N), the operating characteristics of the storage device may be deteriorated. For example, WAF (Write Amplification Factor) characteristics of the storage device may be deteriorated. Therefore, data classification according to the stream class number may be implemented for data including various stream class numbers in each of some of the plurality of memory blocks (Block 1 to Block N). For example, only the data of only one stream class number may be programmed on each of some of the plurality of memory blocks (Block 1 to Block N), using the garbage collection through the storage device according to some example embodiments. This will be explained in detail with reference to the following description.

Figure 4:
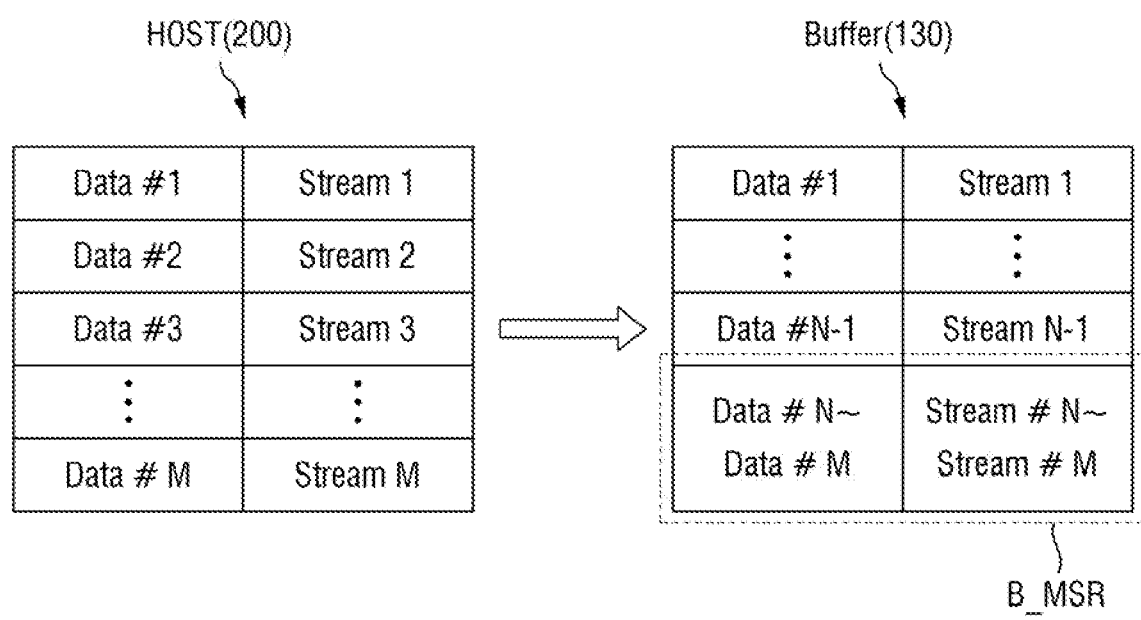
FIG. 4 is an example diagram for explaining the operation in which the buffer according to some example embodiments receives data from the host.

FIG. 4 is an example diagram for explaining the operation in which the buffer according to some example embodiments receives data from the host.

Referring to FIG. 4, the amount of stream class number resources that may be managed by the buffer 130 of the storage device may be smaller than the amount of stream class numbers of the multi-stream transmitted by the host 200. Thus, as described above, in the buffer 130 of the storage device, there may be case where data including the various stream class numbers may be stored in each of some of the plurality of memory blocks.

For example, it may be assumed that the amount of types of stream class number of data transmitted by the host 200 is M. Thus, the host 200 may transmit the first data (DATA #1) having the first stream class number (Stream 1), the second data (DATA #2) having the second stream class number (Stream 2), the third data (DATA #3) having the third stream class number (Stream 3), and a Mth data (DATA #M) having a Mth stream class number (Stream M) to the buffer 130 of the storage device.

Here, it may be assumed that the amount of stream class numbers that may be managed when the buffer 130 of the storage device receives data from the host 200 is N. Here, it may be assumed that M and N are natural numbers greater than 0 and M is a natural number greater than N.

The buffer 130 of the storage device may be able to manage the first data (DATA #1) to the Nth−1 data (DATA #N−1) received from the host 200 according to each stream class number (for example, the first stream class number (Stream 1) to the Nth−1 stream class number (Stream N−1)). However, the data from the Nth data (DATA #N) to the Mth data (DATA #M) may not be managed according to the each stream class number (for example, Nth stream class number (Stream N) to Mth stream class (Stream M)). Thus, a buffer multi-stream region B_MSR (in which data from Nth stream class number (Stream N) to Mth stream class number (Stream M) (for example, Nth data (DATA #N) to Mth data (DATA #M)) may not be managed according to the stream class number) may be generated in the buffer 130 of the storage device.

For reference, while the physical data are stored in the buffer 130 of the storage device, a physical mapping table, in which the physical block address (PBA) corresponding to the logical block address (LBA) for each data is stored, may be updated. This will be explained in detail referring to FIGS. 5 and 6.

FIG. 5 is an example block diagram for explaining a storage system that includes a storage device including a physical mapping table buffer according to some example embodiments. FIG. 6 is an example diagram for explaining the physical mapping table according to some example embodiments.

Referring to FIGS. 5 and 6, the storage device according to some example embodiments may further include a physical mapping table buffer 160, different from FIG. 1. For reference, repeated configuration and operation of FIG. 1 will be omitted, and differences will be mainly explained.

The controller 120 may control the physical mapping table buffer 160 in addition to the configuration explained in FIG. 1.

The physical mapping table buffer 160 may store the above-mentioned physical mapping table information. For example, the physical mapping table may help to find the data requested by the host 200. Or, the physical mapping table may help to find the position at which the data to be recorded by the host 200 are recorded.

For example, a first logical block address (LBA #1) and a first physical block address (PBA #) corresponding to the first logical block address (LBA #1) may be stored in the physical mapping table. Also, a second logical block address (LBA #2) and the second physical block address (PBA #2) corresponding to the second logical block address (LBA #2) may be stored in the physical mapping table. An Nth logical block address (LBA #N) and an Nth physical block address (PBA #N) corresponding to the Nth logical block address (LBA #N) may be stored in the physical mapping table.

The physical mapping table buffer 160 may be, for example, an SLC (Single Level Cell) region of a DRAM (Dynamic Random Access Memory), a SRAM (Static Random Access Memory), a flash memory, etc.

Referring to FIG. 4 again, for the buffer multi-stream region B_MSR, the classification operation of programming data having the same stream class number into the same block on the basis of the stream class number may be performed by the controller of FIG. 120. The aforementioned classification operation may be performed through the garbage collection (GC) using the controller 120 of FIG. 1.

Here, the controller 120 of FIG. 1 may be used to identify the stream class number (for example, Nth stream class number (Stream N) to Mth stream class number (Stream M)) for each data (for example, Nth data (DATA #N) to Mth data (DATA #M)) included in the buffer multi-stream region B_MSR. The controller 120 of FIG. 1 may identify the stream class number of each data, using the stream mapping table or by utilizing the extra data space as below.

First, an operation of identifying the stream class number of each data by the controller 120 of FIG. 1 using the stream mapping table will be explained referring to FIGS. 7 and 8.

Figure 7:
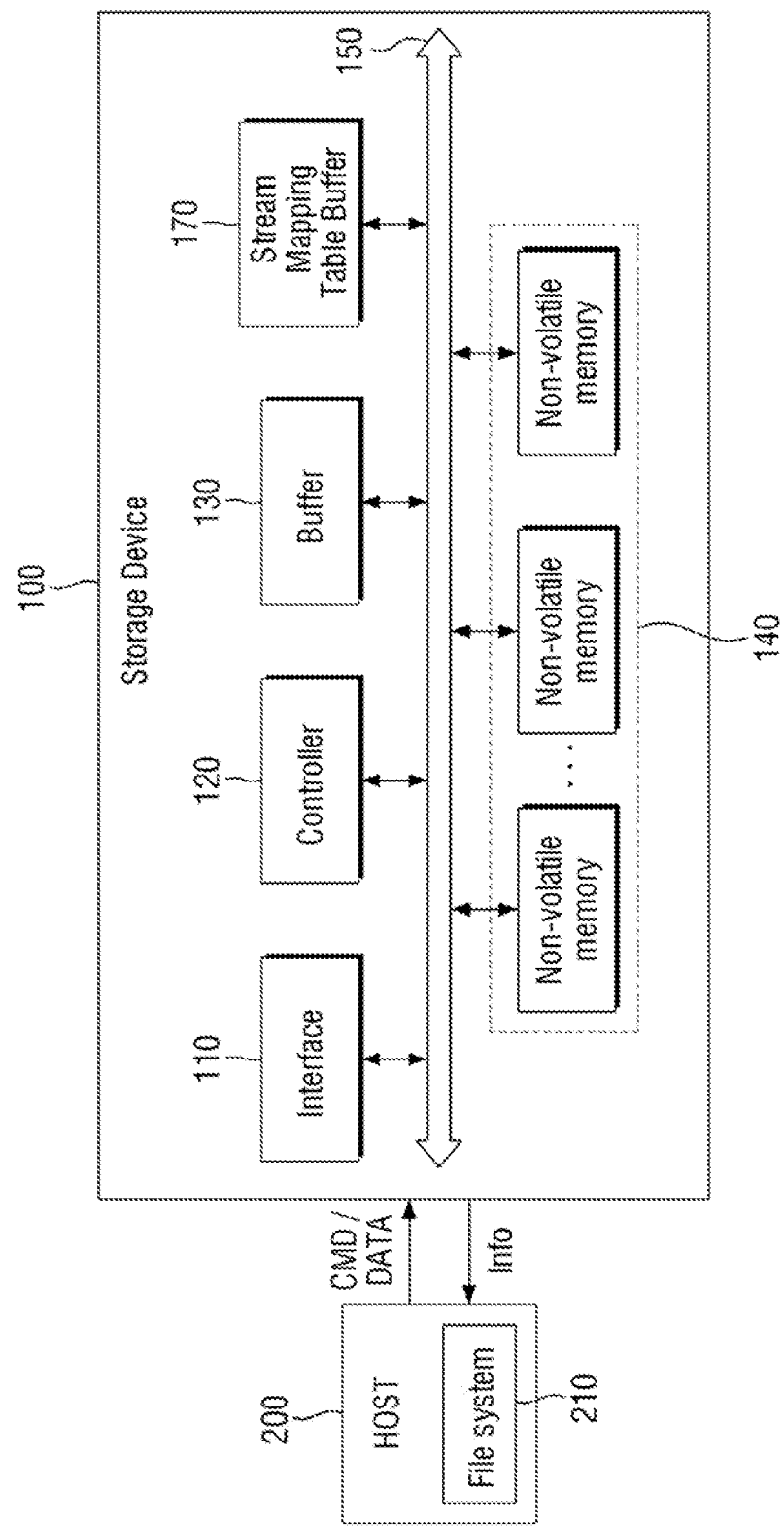
FIG. 7 is an example block diagram for explaining a storage system that includes a storage device including a stream mapping table buffer according to some example embodiments.

FIG. 7 is an example block diagram for explaining a storage system that includes a storage device including a stream mapping table buffer according to some example embodiments. FIG. 8 is an example diagram for explaining the stream mapping table according to some example embodiments. For clarity, repeated configuration and operation of FIG. 1 will be omitted, and differences will be mainly explained.

Referring to FIGS. 7 and 8, the storage device according to some example embodiments may further include a stream mapping table buffer 170, unlike FIG. 1.

The controller 120 may control the stream mapping table buffer 170 in addition to the configuration explained in FIG. 1.

The stream mapping table buffer 170 may store the above-mentioned stream mapping table information. For example, the stream mapping table may help the controller 120 to identify the stream class number of data.

For example, the first logical block address (LBA #1) and the first stream class number (Stream 1) corresponding to the first logical block address (LBA #1) may be stored in the stream mapping table. Further, the second logical block address (LBA #2) and the second stream class number (Stream 2) corresponding to the second logical block address (LBA #2) may be stored in the stream mapping table. The Nth logical block address (LBA #N) and the Nth stream class number (Stream N) corresponding to the Nth logical block address (LBA #N) may be stored in the stream mapping table.

The stream mapping table buffer 170 may be, for example, an SLC (Single Level Cell) region of a DRAM (Dynamic Random Access Memory), a SRAM (Static Random Access Memory), a flash memory, etc.

For reference, the storage device 100 according to some example embodiments may include both the physical mapping table buffer 160 and the stream mapping table buffer 170 described above. This may be explained as an example with reference to FIG. 9.

Figure 9:
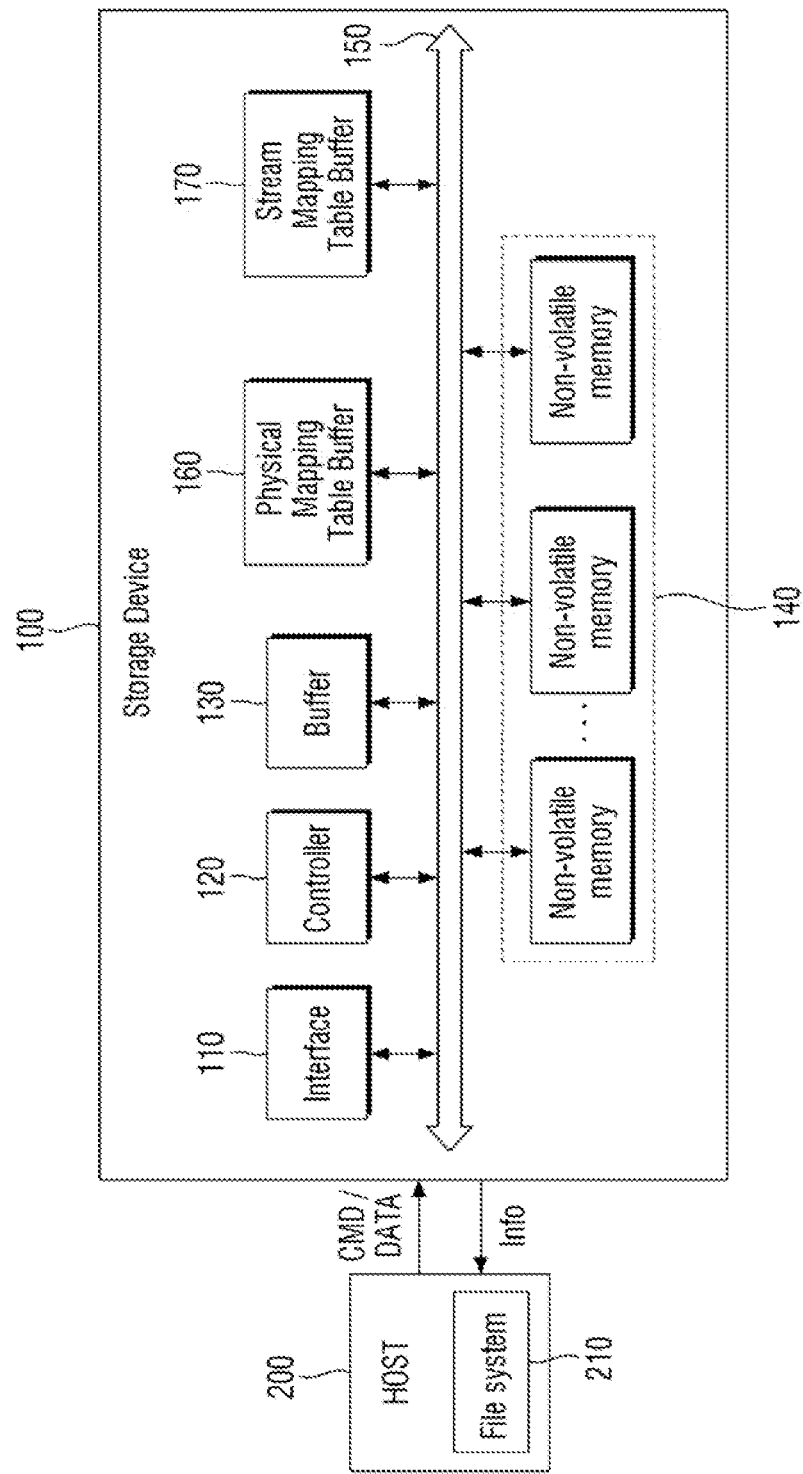
FIG. 9 is an example block diagram for explaining a storage system that includes a storage device including the physical mapping table buffer and the stream mapping table buffer according to some example embodiments.

FIG. 9 is an example block diagram for explaining a storage system that includes a storage device including the physical mapping table buffer and the stream mapping table buffer according to some example embodiments. For reference, repeated configuration and operation of FIG. 1 will be omitted, and differences will be mainly explained.

Referring to FIG. 9, different from the storage device 100 according to some example embodiments of FIG. 1, the storage device may include both a physical mapping table buffer 160 and a stream mapping table buffer 170.

Thus, the controller 120 may refer to the physical mapping table (stored in the physical mapping table buffer 160) to find the physical block address of the data received from the host 200. Also, when the physical block address of the data is changed, the controller 120 may update the physical mapping table stored in the physical mapping table buffer 160 in real time.

Also, the controller 120 may refer to the stream mapping table stored in the stream mapping table buffer 170 to determine the stream class number of data. For reference, although the stream class number may be stored in the stream mapping table as described above, as shown in FIG. 10, the stream class number may be stored in the extra data space stored in the block of the non-volatile memory 140. This will be explained with reference to FIG. 10.

Figure 10:
FIG. 10 is a diagram explaining an operation of utilizing the extra space of data in the non-volatile memory device according to some example embodiments.

FIG. 10 is a diagram explaining an operation of utilizing the extra space of data in the non-volatile memory device according to some example embodiments.

Referring to FIGS. 1 and 10, the data stored in the non-volatile memory 140 may include an extra space SPARE, in which no data is stored.

In some example embodiments, the extra data space SPARE is an extra space in which no information of data is stored, and may store a stream class number indicating the characteristics of the data. By storing the stream class number of the data in the extra data space SPARE, the controller 120 may immediately identify the stream class number of data, without referring to another configuration (e.g., the stream mapping table buffer 170 of FIG. 9).

Referring to FIG. 4 again, the data transmitted from the host 200 may be stored in the non-volatile memory. This will be explained with reference to FIG. 11.

Figure 11:
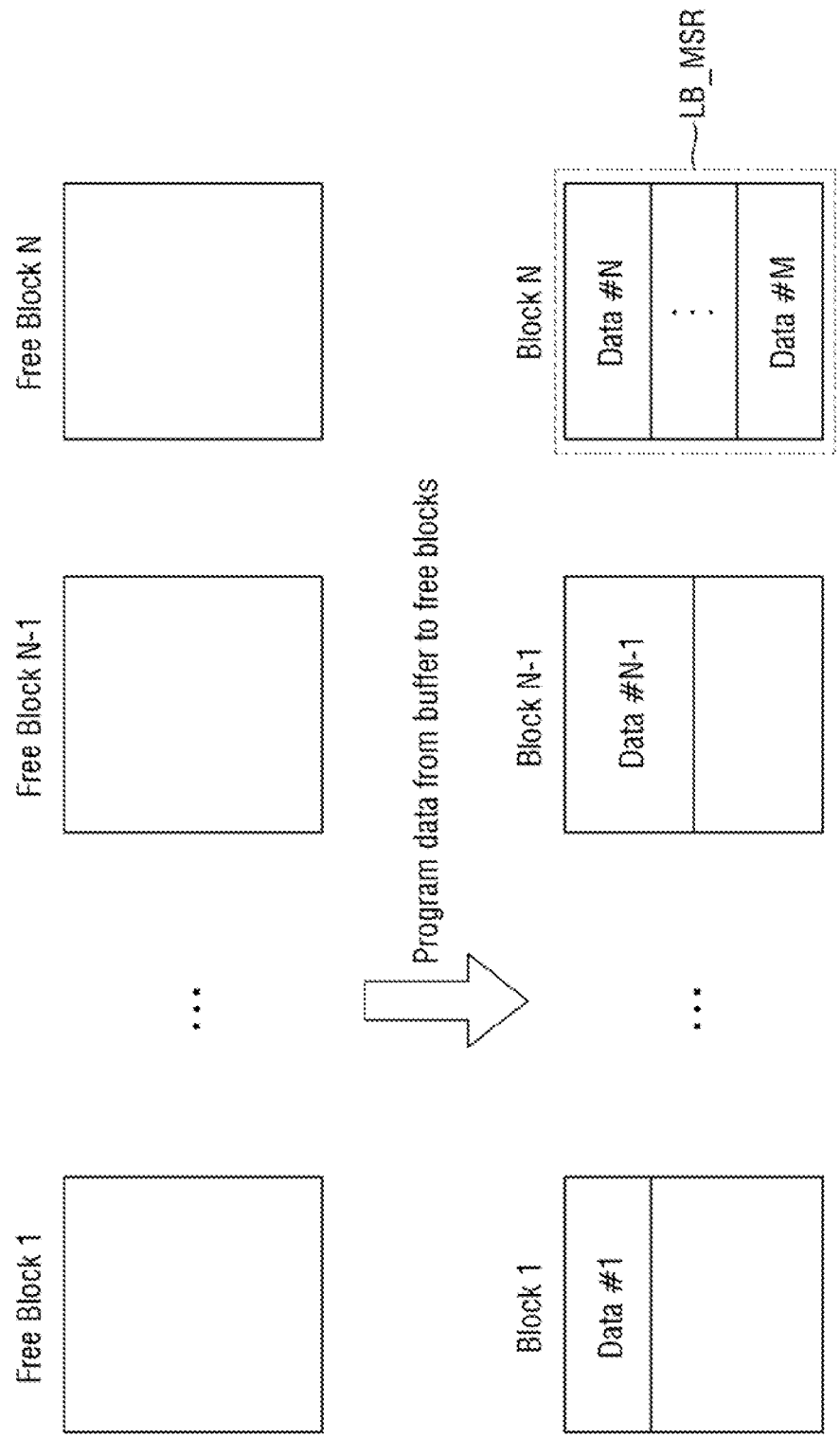
FIG. 11 is an example diagram explaining an operation of programming the data from the buffer according to some example embodiments.

FIG. 11 is an example diagram explaining an operation of programming the data from the buffer according to some example embodiments. For reference, as explained in FIG.

4, it is assumed that M and N are natural numbers greater than 1, and M is greater than N.

Referring to FIGS. 1 and 11, the storage device 100 (where the data is received from the host 200) may temporarily store the data in the buffer 130, and then program and store the data in the block of the non-volatile memory 140.

The non-volatile memory 140 may include a plurality of programmable free blocks (for example, a first free block (Free Block 1) to an Nth-1 free block (Free Block N-1), and an Nth free block (Free Block N)). A plurality of free blocks (for example, the first free block (Free Block 1) to the Nth-1 free block (Free Block N-1), and the Nth free block (Free Block N)) may be blocks in which data are programmable.

For example, the first data (DATA #1) to the Mth data (DATA #M) temporarily stored in the buffer 130 may be programmed in the first free block (Free Block 1) to the Nth free block (Free Block N). Here, it may be assumed that the first data (DATA #1) to the Mth data (DATA #M) have stream class numbers different from each other (for example, the first stream class number to the Mth stream class number).

Each of the first data (DATA #1) to the Nth-1 data (DATA #N-1) may be programmed in the first free block (Free Block 1) and the Nth-1 free block (Free Block N-1), and only the first data having the first stream class number may be programmed in the first block (Block 1). Similarly, only the N-1 data having the N-1th stream class number may be programmed in the Nth-1 block (Block N-1).

However, the Nth data (DATA #N) to the Mth data (DATA #M) may be programmed in the Nth free block (Free Block N). Thus, the Nth data (DATA #N) to the Mth data (DATA #M) having a plurality of stream class numbers (for example, the Nth stream class number (Stream N) to the Mth stream class number (Stream M)) may be programmed in the single Nth block.

In the non-volatile memory 140, there may be a logical block multi-stream (LB_MSR) block, in which a plurality of data (for example, Nth data (DATA #N) to Mth data (DATA #M)) having a plurality of stream class numbers is programmed in a single block (for example, the Nth block (Block N)).

When the plurality of data (e.g., Nth data (DATA #N) to Mth data (DATA #M)) having the plurality of stream class numbers is stored in a single block (e.g., the Nth block (Block N)), the WAF characteristics of the storage device 100 may be deteriorated, as described above in FIG. 4. Therefore, when the controller 120 determines the block in which the multi-streams exist as the victim block, like the logical block multi-stream LB_MSR, and performs the garbage collection on the victim block, the controller 120 may perform the data classification according to the stream class number on the data included in the victim block. Thus, the controller 120 may perform the classification operation on the data of the victim block through the garbage collection so that the data having the same stream class number may be programmed in the same block. Such a classification operation will be explained in detail referring to FIG. 12.

Figure 12:
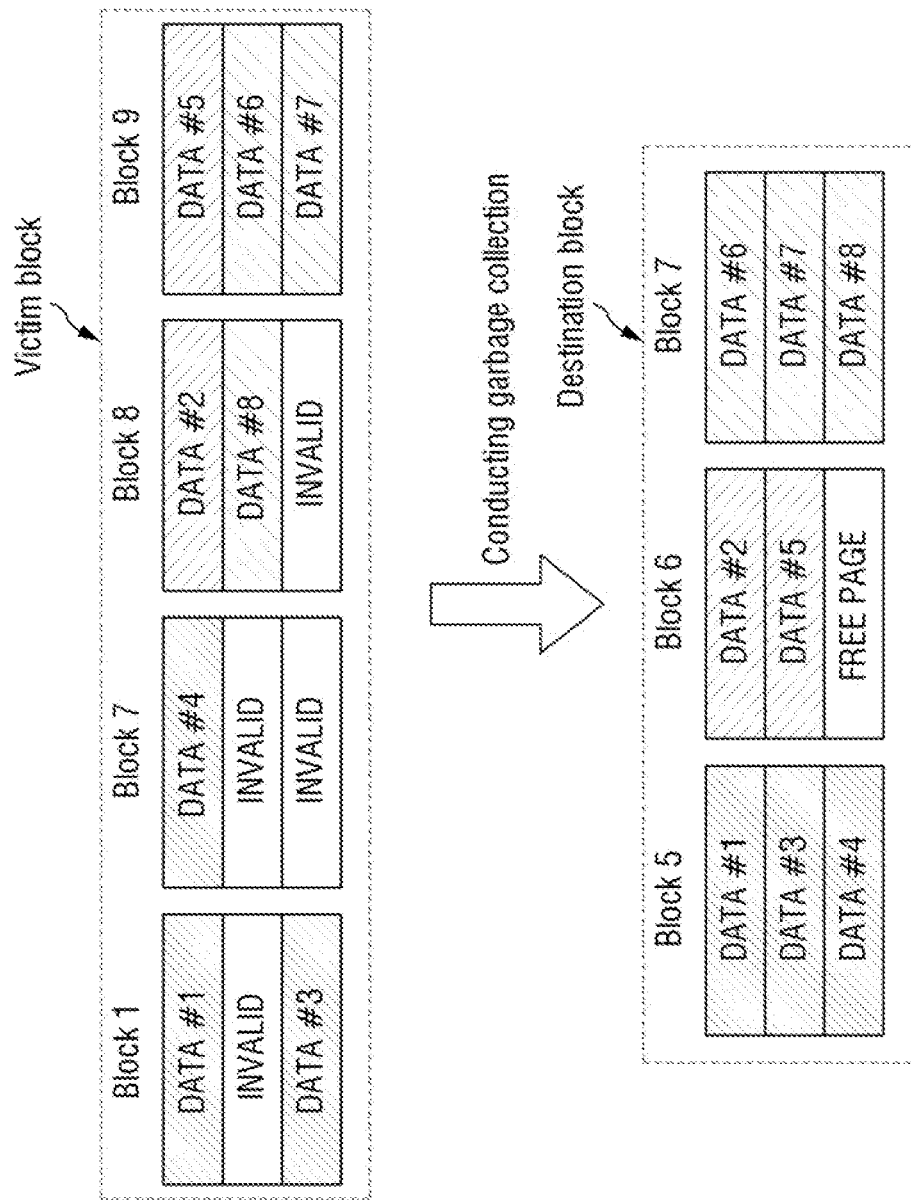
FIG. 12 is an example diagram explaining the garbage collection operation of classifying data in the multi-stream block according to some example embodiments in accordance with the stream class number.

FIG. 12 is an example diagram explaining the garbage collection operation of classifying data in the multi-stream block according to some example embodiments in accordance with the stream class number.

Referring to FIGS. 1 and 12, the classification operation performed on the data received from the host 200 by the controller 120 will be explained. For reference, the explanation of this drawing is an example, and the types of data, the amount of blocks, the types of blocks, etc., are merely examples, and may be varied from this drawing. It may be assumed that the first data (DATA #1), the third data (DATA #3), and the fourth data (DATA #4) all have the first stream class number. It may be assumed that the second data (DATA #2) and the fifth data (DATA #5) all have the second stream class number. Also, it may be assumed that the sixth data (DATA #6), the seventh data (DATA #7), and the eighth data (DATA #8) have all the third stream class number. The stream class numbers of each data in this drawing are merely examples.

The first data (DATA #1) and the third data (DATA #3) are stored in the first block (Block 1). The fourth data (DATA #4) is stored in the seventh block (Block 7). The second data (DATA #2) and the eighth data (DATA #8) are stored in the eighth block (Block 8). Also, the fifth data (DATA #5), the sixth data (DATA #6), and the seventh data (DATA #7) are stored in the ninth block (Block 9). This drawing is merely an example, and the type, position, and the like of the block in which each data is stored may be varied.

As described above, blocks (for example, the eight block (Block 8) and the ninth block (Block 9)), in which data having the stream class numbers different from each other are stored, may exist in some of the blocks of the non-volatile memory 140.

The controller 120 may perform garbage collection to program data having the same stream class numbers in a single block. Thus, the controller 120 may set some of the plurality of blocks of the non-volatile memory 140 as the victim block to perform the classification operation.

For example, by setting the first block (Block 1), the seventh block (Block 7), the eighth block (Block 8), and the ninth block (Block 9) among the plurality of blocks of the non-volatile memory 140 as the victim block, and by performing the garbage collection on the first block (Block 1), the seventh block (Block 7), the eight block (Block 8), and the ninth block (Block 9), the controller 120 may program data having the same stream class number in the same block, on the basis of the stream class numbers classified according to the characteristics of the data.

For example, the controller 120 may program the data (for example, the first data (DATA #1) to the eighth data (DATA #8)), which are programmed in the first block (Block 1), the seventh block (Block 7), the eighth block (Block 8), and the ninth block (Block 9) set as the victim block, in the free blocks (for example, the fifth block (Block 5) to the seventh block (Block 7)) in the non-volatile memory 140 through the garbage collection. Thus, the controller 120 may generate a destination block, in which only the data having the same stream class number are programmed in a single block, from the victim block through the garbage collection. For reference, the destination block generated by the controller 120 may be varied, and may be another type of free block.

For example, the controller 120 may program the first data (DATA #1) and the third data (DATA #3) of the first block (Block 1) in the fifth block (Block 5). Also, the controller 120 may program the fourth data (DATA #4) of the seventh block (Block 7) in the fifth block (Block 5). Also, the controller 120 may program the second data (DATA #2) of the eighth block (Block 8) in the sixth block (Block 6). Also, the controller 120 may program the eighth data (DATA #8) of the eighth block (Block 8) in the seventh block (Block 7). Also, the controller 120 may program the fifth data (DATA #5) of the ninth block (Block 9) in the sixth block (Block 6). Also, the controller 120 may program the sixth data (DATA #6) and the seventh data (DATA #7) of the ninth block (Block 9) in the seventh block (Block 7).

As explained above, the controller 120 may generate a destination block in which only data having the same stream class number are programmed in a single block, through the garbage collection. For example, through the classification operation using the garbage collection of the controller 120, the fifth block (Block 5) may include only the first data (DATA #1), the third data (DATA #3), and the fourth data (DATA #4) having the first stream class number. Also, through the classification operation using the garbage collection of the controller 120, the sixth block (Block 6) may include the second data (DATA #2) and the fifth data (DATA #5) having the second stream class number. Also, through the classification operation using the garbage collection of the controller 120, the seventh block (Block 7) may include only the sixth data (DATA #6), the seventh data (Data #7), and the eighth data (DATA #8) having the third stream class number.

Thus, it may be possible to improve the WAF characteristics of the storage device 100 according to some example embodiments, and to improve the operation reliability of the storage device 100.

Hereinafter, the operation method of the storage device 100 according to some example embodiments will be explained in detail.

Figure 13:
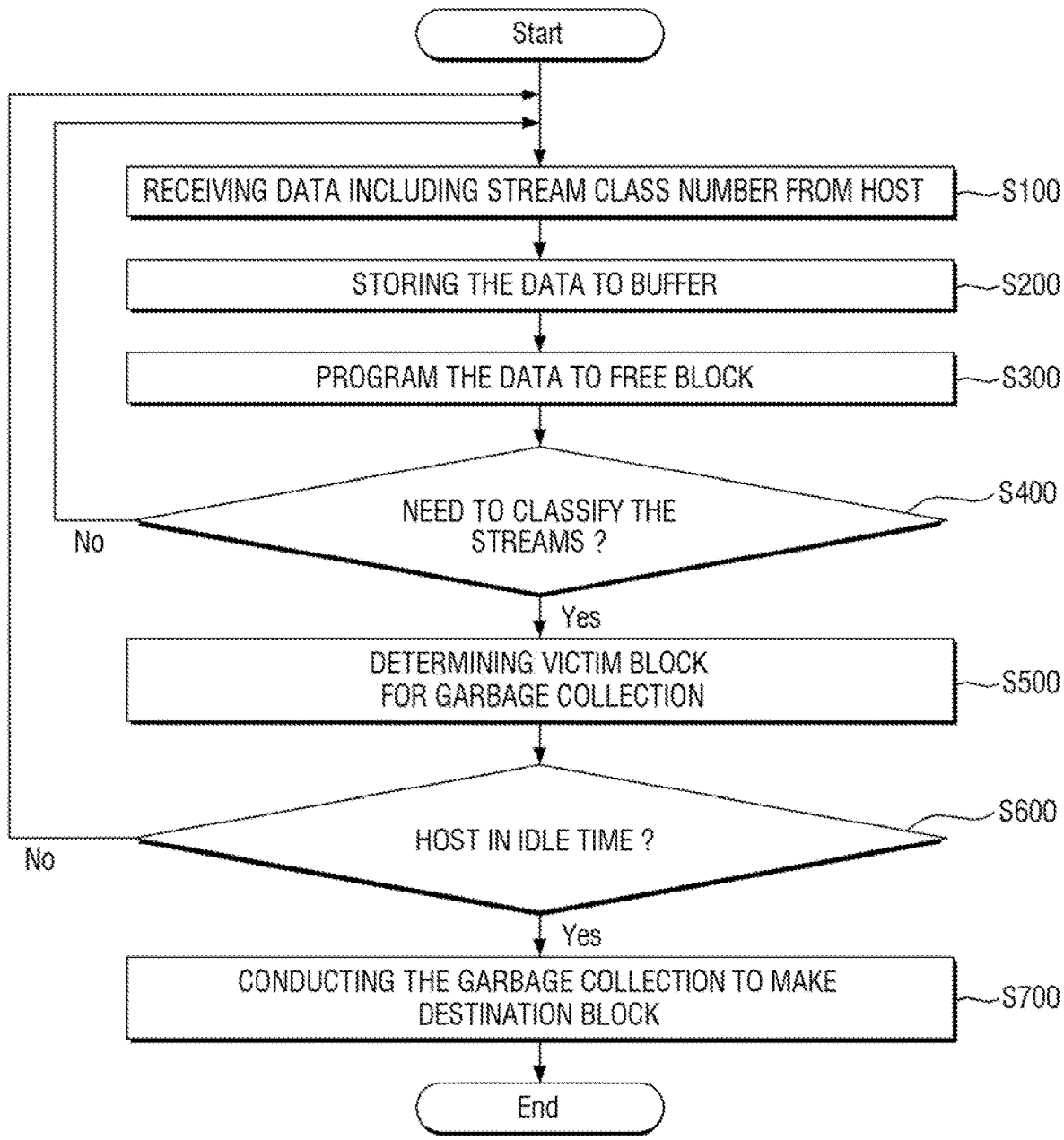
FIG. 13 is an example flowchart explaining the operation of a storage system including the storage device according to some example embodiments.

FIG. 13 is an example flowchart explaining the operation of a storage system including the storage device according to some example embodiments.

Referring to FIGS. 1 and 13, the storage device 100 receives data including the stream class number classified according to the characteristics of the data from the host 200 (S100). The data received from the host 200 may be temporarily stored in the buffer 130 (S200). The data temporarily stored in the buffer 130 may be programmed in a free block in the non-volatile memory 140 (S300). Next, the controller 120 determines whether the data having the same stream class number among the data programmed in the non-volatile memory 140 need to be programmed in the same block (S400).

Here, when the controller 120 determines that the classification operation is not required for the data programmed in the non-volatile memory 140 (No), additional data may be received from the host 200 without any additional operation.

If the controller 120 determines that a classification operation is required for the data programmed in the non-volatile memory 140 (Yes), the controller 120 determines at least some of the plurality of blocks of the non-volatile memory 140 as victim blocks in which the classification operation is performed (S500).

Here, the controller 120 may determine the victim block in which the classification operation is performed using a determination type of the victim block according to some example embodiments. The controller 120 according to some example embodiments may determine the victim block, for example, on the basis of the amount of types of stream class numbers included in each of the blocks in the non-volatile memory 140. In another example, the controller 120 according to some example embodiments may determine a victim block on the basis of the number of valid data included in each of the blocks in the non-volatile memory 140. As another example, on the assumption that some blocks among the blocks in the non-volatile memory 140 are set as victim blocks, the controller 120 according to some example embodiments may determine the victim block by comparing the amount of free blocks to be generated by performing the garbage collection with the amount of free blocks to be eliminated by performing the garbage collection.

A method by which the controller 120 determines the destination victim block in which the classification operation is performed, using the method of determining the victim block according to some example embodiments, will be explained with reference to FIGS. 14 to 20.

First, an operation (S500-1) in which the controller 120 according to some example embodiments determines the victim block, for example, on the basis of the amount of the type of stream class numbers included in each of the blocks in the non-volatile memory 140 will be explained with reference to FIGS. 14 and 15.

Figure 14:
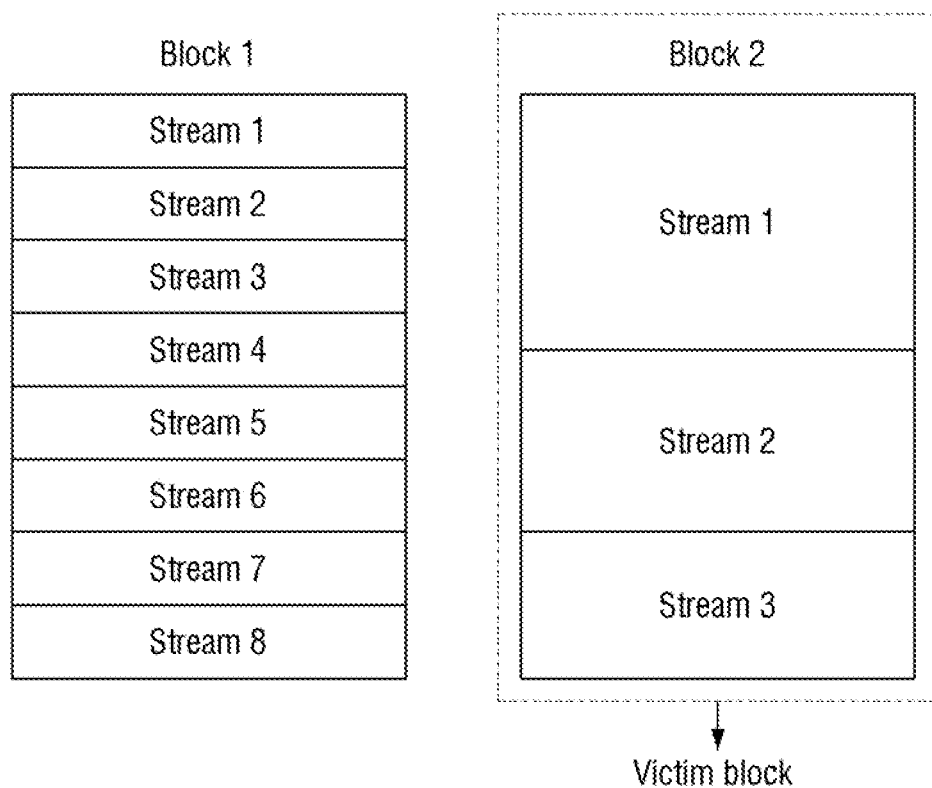
FIG. 14 is an example diagram for explaining the operation of determining the victim block according to some example embodiments.

FIG. 14 is an example diagram for explaining the operation of determining the victim block according to some example embodiments.

Referring to FIGS. 1 and 14, data may be stored in the first block (Block 1) and the second block (Block 2) in the non-volatile memory 140. Although FIG. 14 shows only the first block (Block 1) and the second block (Block 2) as blocks in which data are programmed in the non-volatile memory 140, this is only for convenience of explanation.

Also, although FIG. 14 shows that only the stream class numbers are stored in the first block (Block 1) and the second block (Block 2), this is only for convenience of explanation. As described above, the first block (Block 1) and the second block (Block 2) may store the data and the stream class number associated with the data together, and may store address information and error correction parity together.

The controller 120 according to some example embodiments may determine the block in which the amount of types of the stored stream class numbers is smaller than a pre-defined amount, among the first block (Block 1) and the second block (Block 2), as a victim block. Or, the controller 120 may determine the block in which the amount of types of the stored stream class number is small, among the first block (Block 1) and the second block (Block 2), as the victim block.

For example, the first block (Block 1) may store stream class numbers 1 to 8 (Stream 1 to Stream 8). Thus, the amount of types of stream class number stored in the first block (Block 1) may be eight. The second block (Block 2) may store stream class numbers 1 to 3 (Stream 1 to Stream 3). Thus, the amount of types of stream class number stored in the second block (Block 2) may be three.

If the pre-defined amount is 5, the controller 120 may select the second block (Block 2) among the first block (Block 1) and the second block (Block 2), as a victim block. Or, the controller 120 may select the second block (Block 2), among the first block (Block 1) and the second block (Block 2), as a victim block.

When the block in which the amount of types of stored stream class numbers is smaller than the pre-defined amount among the plurality of blocks, is selected as a victim block, the write amplification factor (WAF) may be minimized, and the power consumption of the storage device 100 may be reduced. Or, when the block in which the amount of types of stored stream class number is the smallest is selected as the victim block, the write amplification factor (WAF) may be minimized, and the power consumption of the storage device 100 may be reduced. An example operation method thereof will now be explained with reference to FIG. 15.

Figure 15:
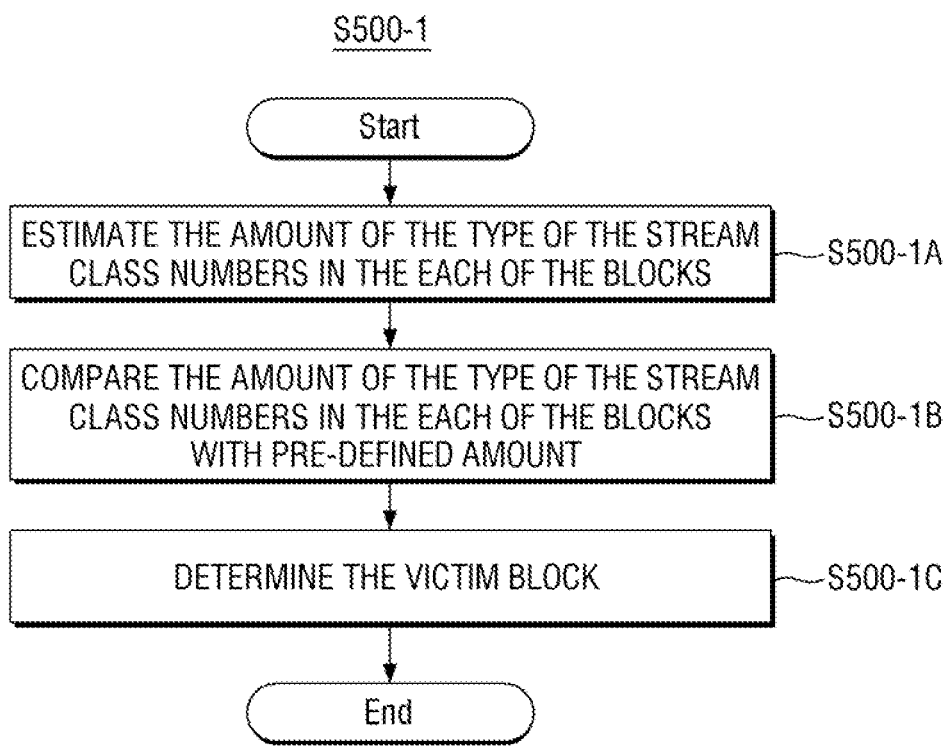
FIG. 15 is an example flow chart for explaining the operation of FIG. 14 which determines the victim block according to some example embodiments.

FIG. 15 is an example flow chart for explaining the operation of FIG. 14 which determines the victim block according to some example embodiments.

Referring to FIGS. 1 and 15, the controller 120 may first measure the amount of types of stream class numbers included in each of the blocks in the non-volatile memory 140 (S500-1A). Next, the controller 120 may compare the amount of types of the measured stream class numbers with the pre-defined amount (S500-1B). Next, the controller 120 may define the blocks in which the amount of types of measured stream class numbers is determined to be smaller than the pre-defined amount, as the victim block (S500-1C). Or, in operation S500-1B, the controller 120 may define the block having the amount of types of smallest stream class numbers among the blocks measured in operation S500-1A, as the victim block (S500-1C).

Next, an operation (S500-2) in which the controller 120 according to some example embodiments determines the victim block, for example, on the basis of the amount of the valid data included in each of the blocks in the non-volatile memory 140 will be explained referring to FIGS. 16 and 17.

Figure 16:
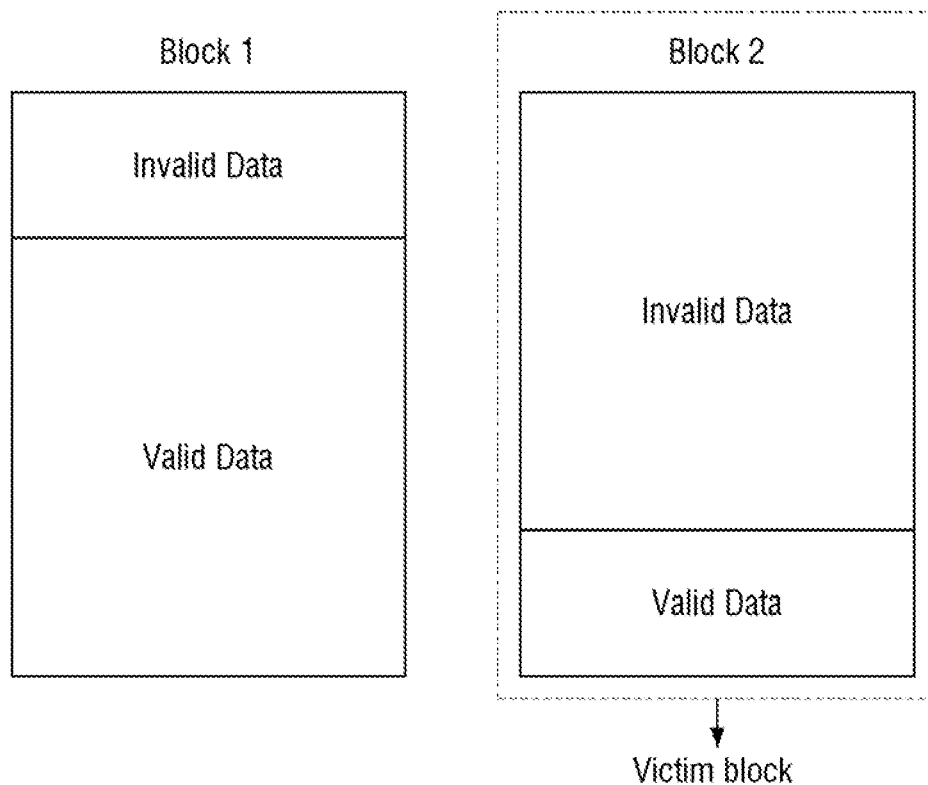
FIG. 16 is an example diagram for explaining an operation of determining a victim block according to some example embodiments.

FIG. 16 is an example diagram for explaining an operation of determining a victim block according to some example embodiments. FIG. 17 is an example flowchart for explaining the operation of FIG. 16 for determining the victim block according to some example embodiments.

Referring to FIGS. 1 and 16, the non-volatile memory 140 of the storage device 100 may include a plurality of blocks. For convenience of explanation, repeated explanation of contents explained in FIG. 14 will be omitted or briefly explained.

The controller 120 according to some example embodiments may determine the block, in which the number of valid data among the data stored in each of the plurality of blocks is smaller than the pre-defined number, as a victim block. Or, the controller 120 according to some example embodiments may determine the block in which the number of valid data is the smallest among the data stored in each of the plurality of blocks, as the victim block.

For example, each of the width of the valid data and the width of the invalid data shown in FIG. 16 may mean the percentage of valid data and invalid data among the data stored in the first block (Block 1) and the second block (Block 2).

For example, the number of valid data of the first block (Block 1) may be larger than the number of invalid data of the first block (Block 1). Further, the number of valid data of the second block (Block 2) may be smaller than the number of invalid data of the second block (Block 2). Furthermore, if the size of the first block (Block 1) and the second block (Block 2) are the same, the number of valid data of the first block (Block 1) may be larger than the number of valid data of the second block (Block 2).

If the pre-defined number is 5, the number of valid data of the first block (Block 1) is 10, and the number of valid data of the second block (Block 2) is 3, the controller 120 according to some example embodiments may determine the second block (Block 2) as a victim block. Or, the controller 120 according to some example embodiments may determine the second block (Block 2) having the smallest valid data among the first block (Block 1) and the second block (Block 2), as a victim block.

When the controller 120 according to some example embodiments selects a block in which the number of valid data is smaller than a pre-defined number among a plurality of blocks, as a victim block, the write amplification factor (WAF) may be minimized and the power consumption of the storage device 100 may be reduced. Alternatively, when the controller 120 according to some example embodiments selects the block having the smallest number of valid data among the plurality of blocks as a victim bock, the write amplification factor WAF may be minimized, and the power consumption of the storage device 100 may be reduced. A specific operation method thereof will be explained with reference to FIG. 17.

Figure 17:
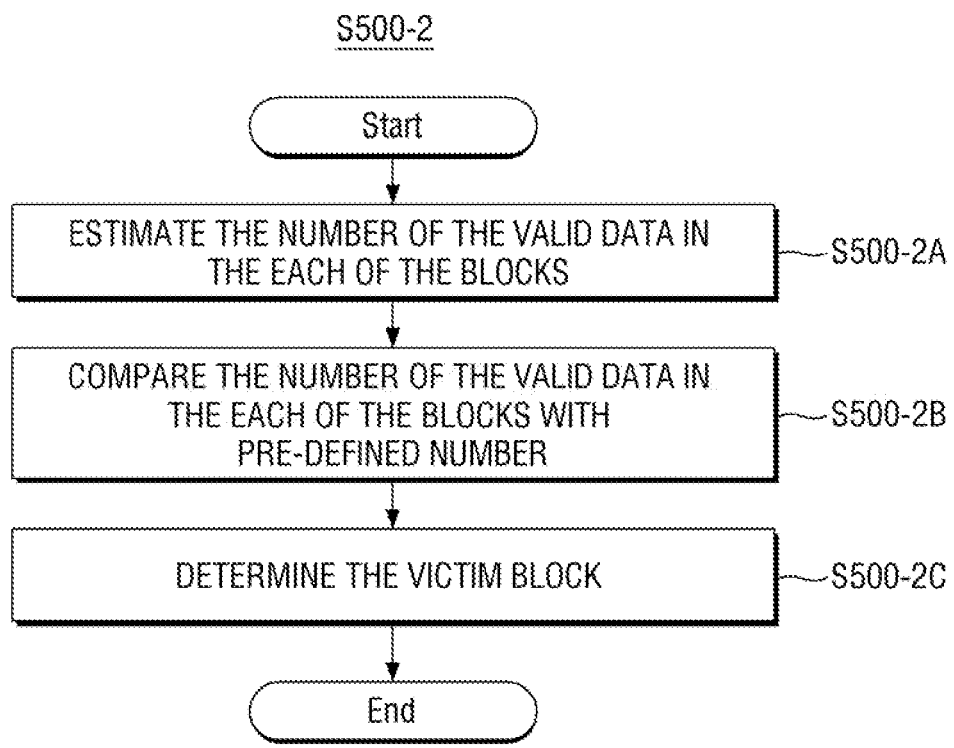
FIG. 17 is an example flowchart for explaining the operation of FIG. 16 for determining the victim block according to some example embodiments.

Referring to FIGS. 1 and 17, the controller 120 may first measure the number of valid data included in each of the blocks in the non-volatile memory 140 (S500-2A).

Next, the controller 120 may compare the number of measured valid data with the pre-defined number (S500-2B). Next, the controller 120 may determine a block in which the number of measured valid data is determined to be smaller than a pre-defined number, as a victim block (S500-2C). Or, in operation S500-2B, the controller 120 may determine the block having the smallest number of valid data among the blocks measured in operation S500-2A, as a victim block (S500-2C).

Figure 18:
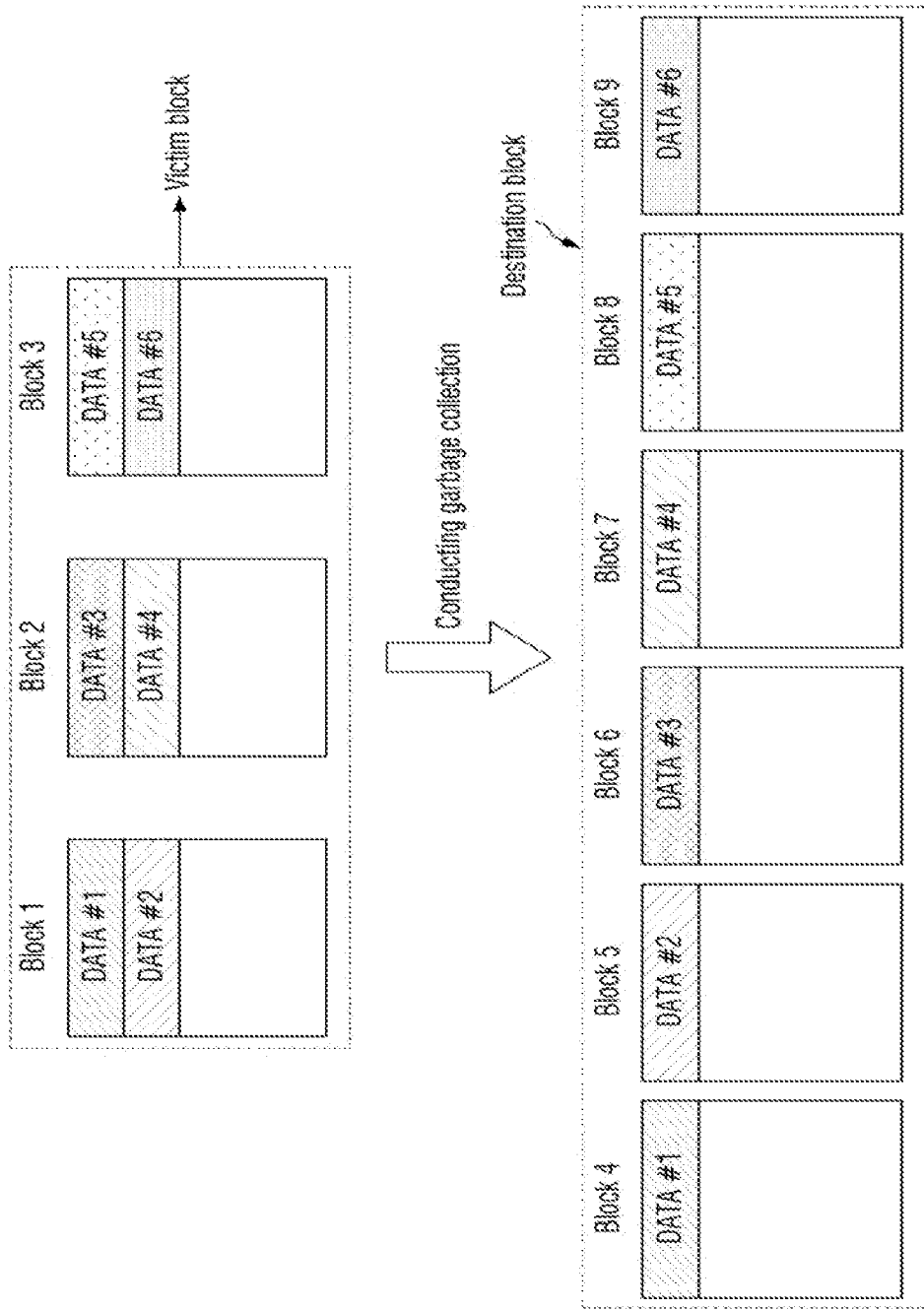
FIGS. 18 and 19 are example diagrams for explaining the operation of determining a victim block according to some example embodiments.
Figure 19:
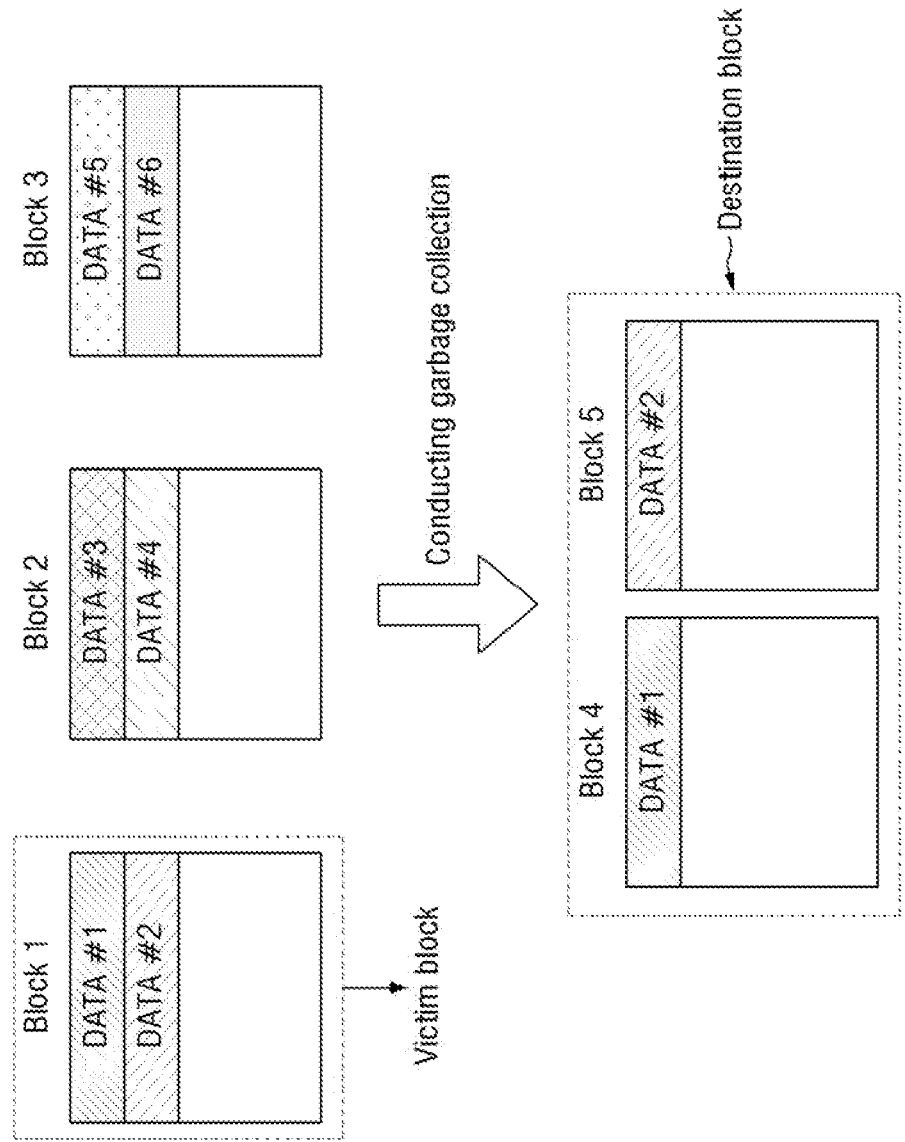

FIGS. 18 and 19 are example diagrams for explaining the operation of determining a victim block according to some example embodiments. FIG. 20 is an example flowchart for explaining the operation of FIGS. 18 and 19 for determining the victim block according to some example embodiments. Repeated explanation of the blocks and the data in the non-volatile memory 140 will be omitted or briefly explained.

Referring to FIGS. 18 to 20, an operation S500-3 will be explained for determining the victim block, by comparing the amount of free blocks to be generated by performing the garbage collection with the amount of free blocks to be eliminated by performing the garbage collection, on the assumption that the controller 120 according to some example embodiments sets some blocks among the blocks in the non-volatile memory 140 as the victim block.

First, referring to FIGS. 1 and 18, for example, the first data (DATA #1) to the sixth data (DATA #6) may be stored in the first block (Block 1) to the third block (Block 3) in the non-volatile memory 140. It is assumed that the first data (DATA #1) to the sixth data (DATA #6) have all the stream class numbers different from each other (for example, the first stream class number to the sixth stream class number).

It is assumed that the controller 120 determines the first block (Block 1) to the third block (Block 3) among the blocks in the non-volatile memory 140 as the victim block. The controller 120 performs the garbage collection on the victim block to calculate the destination block after the classification operation is performed.

For example, the controller 120 may assume the first block (Block 1) to the third block (Block 3) as the victim block. The controller 120 may calculate the destination block after performing the classification process on the victim block through the garbage collection. The destination block may include, for example, a fourth block (Block 4) in which the first data (DATA #1) having the first stream class number is stored. Further, the destination block may include, for example, a fifth block (Block 5) in which second data (DATA #2) having a second stream class number is stored. Further, the destination block may include, for example, a sixth block (Block 6) in which third data (DATA #3) having a third stream class number is stored. Further, the destination block may include, for example, a seventh block (Block 7) in which fourth data (DATA #4) having a fourth stream class number is stored. Further, the destination block may include, for example, an eighth block (Block 8) in which fifth data (DATA #5) having a fifth stream class number is stored. Further, the destination block may include, for example, a ninth block (Block 9) in which sixth data (DATA #6) having a sixth stream class number is stored.

When the controller 120 determines the first block (Block 1) to the third block (Block 3) as a victim block, the total amount of free blocks that is eliminated to generate the destination block may be measured to be six (the fourth block (Block 4) to the ninth block (Block 9)), and the total amount of generated free blocks may be measured to be three (the first block (Block 1) to the third block (Block 3)). Thus, the controller 120 may determine that the total amount of six eliminated free blocks is larger than the total amount of generated three free blocks, and may not determine the first block (Block 1) to the third block (Block 3) as the victim block.

A case of assuming that the controller 120 determines only the first block (Block 1) as the victim block will be explained referring to FIGS. 1 and 19.

The controller 120 may perform the garbage collection on the victim block to calculate the destination block after the classification operation is performed. For example, the controller 120 may assume the first block (Block 1) as a victim block. The controller 120 may calculate the destination block after performing the classification process on the victim block through the garbage collection. The destination block may include, for example, a fourth block (Block 4) in which first data (DATA #1) having the first stream class number is stored. Further, the destination block may include, for example, a fifth block (Block 5) in which second data (DATA #2) having the second stream class number is stored.

When the controller 120 determines the first block (Block 1) as the victim block, the total amount of free blocks eliminated to generate the destination block may be measured to be two (fourth block (Block 4) and fifth block (Block 5)), and the total amount of generated free blocks may be measured to be one (first block (Block 1)). Thus, the controller 120 determines that the total amount of two eliminated free blocks is larger than the total amount of one generated free block, and may not determine the first block (Block 1) to the third block (Block 3) as the victim block. Opposite to this case, that is, where the controller 120 performs the garbage collection on the block to be determined as the victim block, and the amount of free blocks to be generated is determined to be greater than the amount of free blocks to be eliminated, the garbage collection may be performed on the victim block.

As described above, by maximizing the amount of free blocks to be generated when the controller 120 according to some example embodiments performs the garbage collection on the victim block, it may be possible to minimize the write amplification factor (WAF), and lower the power consumption of the storage device 100. An example of a specific operation method thereof according to another example embodiment will now be explained with reference to FIG. 20.

Referring to FIGS. 1 and 20, the controller 120 may first assume a victim block on which the garbage collection is performed, and measure amounts of each of generated free blocks after the garbage collection is performed, and eliminated free blocks after the garbage collection is performed (S500-3A). Next, the controller 120 may compare the amount of the generated free blocks with the amount of the eliminated free blocks (S500-3B). Next, the controller 120 may define the victim block assumed in S500-1A as the victim block when the amount of generated free blocks is determined to be larger than the amount of eliminated free blocks (S500-3C).

Referring FIGS. 1 and 13 again, after the controller 120 may determine the victim block on which garbage collection will be performed and, before performing garbage collection, the controller 120 may transmit operation information about the garbage collection to an external device (e.g., the host 200; the following explanation will be provided on the assumption that the external device is the host 200), and then wait for a response about whether to perform the garbage collection from the host 200 (S600). This will now be explained in detail referring to FIG. 21.

FIG. 21 is an example diagram for explaining a signal transmission operation between the host and the storage device according to some example embodiments.

Referring to FIGS. 1 and 21, the storage device 100 may transmit information (Info) about the garbage collection execution operation on the victim block in which the garbage collection is performed to the host 200.

The information (Info) transmitted to the host 200 by the storage device 100 may be the time, resources, power, etc., that may be called for when the garbage collection is performed. Or, the information (Info) transmitted to the host 200 by the storage device 100 may be the amount of generated free blocks and the amount of eliminated free blocks when garbage collection is performed, etc. Or, the information (Info) transmitted to the host 200 by the storage device 100 may be the number of free blocks included in the current non-volatile memory 140, etc. The information (Info) transmitted to the host 200 by the storage device 100 may be any type of information about the garbage collection performed by the controller 120.

The host 200 may receive information (Info) from the storage device 100 and determine whether the current host 200 is in an idle state. The host 200 may determine that the host 200 is in the idle state, may transmit signals indicating that the host 200 is in the idle state to the storage device 100, and may allow the storage device 100 to perform the garbage collection.

In an example embodiment, the host 200 may transmit the garbage collection permission signal to the storage device 100 when, for example, the host 200 determines that the host 200 has no plan to shut down power, the host 200 has no plan to consume large amounts of power, etc., and then the storage device 100 may determine that the garbage collection may be performed.

Referring to FIGS. 1 and 13 again, in operation S600, if the storage device 100 does not receive the garbage collection execution permission command from the host 200, for example, if the host 200 is not idle (No), the storage device 100 may not perform the garbage collection, and may instead receive the data from the host 200 again.

If the storage device 100 receives the garbage collection execution permission command from the host 200, for example, if the host 200 is idle (Yes) in operation S600, the storage device 100 may perform the garbage collection that generates the destination block (S700).

In some example embodiments, the garbage collection of the storage device described above may be performed in a background operation. Thus, even if there is no command received from the host 200, if the controller 120 determines that a classification operation is called for, the controller of the storage device 100 may perform the garbage collection. Thus, the garbage collection may be performed when there is no command received from the host 200, when the storage device 100 is in an idle state, etc.

By way of summation and review, an overwrite may not be possible due to characteristics of a NAND-based drive. Thus, a garbage collection, such as copy of user data to new storage blocks and an erase of invalid data storage blocks, may be used. However, the garbage collection may reduce both read and write performance of the NAND-based drive. For example, data write requests may cause several internal SSD writes on the medium, and thus the garbage collection may increase write amplification. The write amplification may occur, for example, when the valid data is read first from the media block to be erased and then rewritten on another media storage block accompanying a write for storing new host data. A host may classify related or similar data into the same stream class number. The garbage collection may be removed or reduced, by storing data of the same stream class number on the same erase block or on the same drive. However, if data including various stream class numbers are stored separately in each block, because the data are distributed and stored in each block, power may be consumed separately and time losses may occur.

As described above, embodiments may provide a storage device that efficiently migrates data having the same stream to the same block through a garbage collection. Embodiments may also provide a method of operating a storage device that that efficiently migrates data having a same stream to a same block through a garbage collection.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operating method of a storage device, comprising:
receiving, from a host, first data and second data, each including stream class numbers classified based on characteristics of data;
storing the first data and second data in a buffer in the storage device;
programming the first data and the second data stored in the buffer, in a plurality of blocks in a non-volatile memory;
determining a victim block among the plurality of blocks based on an amount of types of the stream class numbers of the first data and the second data that are included in each of the plurality of blocks;
performing garbage collection to classify the first data and the second data in the victim block according to the stream class numbers and migrate the first data and the second data having a same stream class number from the victim block to a same destination block as a single block; and
transmitting information about the garbage collection on the victim block to the host,
wherein the information transmitted to the host by the storage device includes an amount of generated free blocks and an amount of eliminated free blocks by performing the garbage collection.

2. The operating method of claim 1, wherein the stream class numbers are classified into predefined Hot, Warm, and Cold pages.

3. The operating method of claim 1, further comprising:
determining whether the host is in an idle state;
transmitting a signal indicating that the host is in the idle state to the storage device; and
performing the garbage collection in response to the signal.

4. The operating method of claim 1, wherein the information transmitted to the host by the storage device includes a number of free blocks included in the non-volatile memory.

5. The operating method of claim 1, further comprising transmitting a garbage collection permission signal to the storage device when the host determines that the host has no plan to shut down power or the host has no plan to consume large amounts of power.

6. The operating method of claim 5, further comprising determining whether the garbage collection is performed, by the storage device after receiving the garbage collection permission signal.

7. The operating method of claim 1, wherein:
the stream class numbers are stored in each of an extra data space of the first and the second data in the non-volatile memory, and
the characteristics of the data are determined based on the extra data space.

8. The operating method of claim 1, wherein the determining the victim block further includes:
measuring the amount of types of stream class numbers included in each of the plurality of blocks in which the first and second data are stored; and
comparing the amount of types of stream class numbers with a pre-defined amount.

9. The operating method of claim 1, wherein the determination of the victim block includes:
measuring a number of valid data included in each of the plurality of blocks in which the first and second data are stored,
comparing the number of valid data with a pre-defined number, and
determining a block in which the number of valid data is determined to be smaller than the pre-defined number, as the victim block.

10. A storage device, comprising:
a buffer configured to receive first data and second data from a host and store the first data and the second data on a first page;
a non-volatile memory configured to store the first data and the second data, wherein the first data includes a first stream class number that identifies characteristics of the first data, and the second data includes a second stream class number that identifies characteristics of the second data, the second stream class number being different from the first stream class number; and
a controller configured to exchange commands and the first data and the second data between the host and the non-volatile memory, wherein the controller is configured to:
program the first data and second data in a plurality of blocks in the non-volatile memory;
determine a victim block according to an amount of types of the first and second stream class numbers of the first data and the second data included in a block of the plurality of blocks;
perform garbage collection to classify the first data and the second data in the victim block according to the first and second stream class numbers and migrate the first data and the second data each having same stream class number to the same free block among the plurality of blocks; and
transmit information about the garbage collection to the host,
wherein the information transmitted to the host by the controller includes an amount of generated free blocks and an amount of eliminated free blocks when the garbage collection is performed.

11. The storage device as claimed in claim 10, wherein the first data and the second data are classified into predefined Hot, Warm, and Cold pages.

12. The storage device as claimed in claim 10, further comprising:
a physical mapping table buffer to store a physical mapping table information that stores a first physical block address corresponding to a first logical block address of the first data, and a second physical block address corresponding to a second logical block address of the second data, and
wherein the controller is configured to update the physical mapping table information when the program of the first data and the second data is performed.

13. The storage device as claimed in claim 11, further comprising:
a stream mapping table buffer, to store a stream mapping table information that stores the first stream class number corresponding to the first logical block address of the first data and the second stream class number corresponding to the second logical block address of the second data,
wherein the controller is configured to determine the characteristics of the first data and the characteristics of the second data using the stream mapping table information.

14. The storage device as claimed in claim 10, wherein:
the first data stored in the non-volatile memory includes a first extra data space to store the first stream class number, and
the second data includes a second extra data space to store the second stream class number.

15. The storage device as claimed in claim 10, wherein the controller is further configured to:
determine whether a number of valid data included in the victim block is smaller than a pre-defined number,
perform the garbage collection when the number of valid data included in the victim block is smaller than the pre-defined number.

16. A storage system, comprising:
a host configured to transmit first data and second data including corresponding stream class numbers that are classified depending on respective characteristics of the first data and the second data;
a non-volatile memory including a plurality of blocks in which the first data and second data are stored; and
a controller configured to exchange commands and the first data and second data between the host and the non-volatile memory through an interface, wherein the controller is configured to:
program the first data and the second data in at least one block in the non-volatile memory;
determine a victim block based on an amount of types of the stream class numbers of the first data and the second data included in a block of the plurality of blocks;
perform garbage collection to classify the first data and the second data in the victim block according to the stream class numbers and migrate each of the first data and second data having the same stream class number from the victim block to the same free block in the non-volatile memory; and
transmit information about the garbage collection on the victim block to the host,
wherein the information transmitted to the host by the controller includes an amount of generated free blocks and an amount of eliminated free blocks when the garbage collection is formed.

17. The storage system as claimed in claim 16, wherein:
the first and second data stored in the non-volatile memory includes an extra data space to store the stream class numbers, respectively.

18. The storage system as claimed in claim 16, wherein the controller is configured to:
determine whether a number of valid data in the victim block is smaller than a pre-defined number,
perform the program of the first data and the second data when the number of valid data is smaller than the pre-defined number, and
not perform the program of the first data and the second data when the number of valid data is not smaller than the pre-defined number.

19. The storage system as claimed in claim 16, wherein the information transmitted to the host by the controller includes a number of free blocks included in the non-volatile memory.

* * * * *